United States Patent
Ha et al.

(10) Patent No.: US 7,800,566 B2
(45) Date of Patent: Sep. 21, 2010

(54) DRIVE DEVICE OF COLOR LED BACKLIGHT

(75) Inventors: Chang Woo Ha, Kyungki-do (KR); Sang Cheol Shin, Kyungki-do (KR); Byoung Own Min, Kyungki-do (KR)

(73) Assignee: Samsung Electro-Mechanics Co., Ltd., Suwon, Kyungki-do (KR)

( * ) Notice: Subject to any disclaimer, the term of this patent is extended or adjusted under 35 U.S.C. 154(b) by 965 days.

(21) Appl. No.: 11/565,569

(22) Filed: Nov. 30, 2006

(65) Prior Publication Data
US 2007/0182698 A1 Aug. 9, 2007

(30) Foreign Application Priority Data
Feb. 9, 2006 (KR) ............... 10-2006-0012691

(51) Int. Cl.
*G09G 3/32* (2006.01)
(52) U.S. Cl. .................................... 345/82; 345/102
(58) Field of Classification Search ............ 345/76–102
See application file for complete search history.

(56) References Cited

U.S. PATENT DOCUMENTS

| 6,888,529 | B2 | 5/2005 | Bruning et al. |
| 7,317,403 | B2 * | 1/2008 | Grootes et al. ......... 340/815.45 |
| 7,499,016 | B2 * | 3/2009 | Oh et al. ..................... 345/102 |

2005/0116922 A1 6/2005 Kim

FOREIGN PATENT DOCUMENTS

| JP | 2003-241714 A | 8/2003 |
| JP | 2005-157394 A | 6/2005 |

* cited by examiner

*Primary Examiner*—Kevin M Nguyen
*Assistant Examiner*—Kenneth B Lee, Jr.
(74) *Attorney, Agent, or Firm*—Lowe Hauptman Ham & Berner LLP

(57) ABSTRACT

Disclosed herein is a drive device of a color light emitting diode (LED) backlight, which is capable of precisely adjusting the forward voltages of color LED arrays for each channel.

The drive device for driving the color light emitting diode (LED) backlight which includes a plurality of color LED arrays includes an I/O interface for inputting/outputting a signal, a control unit for controlling a driving voltage and driving current according to a brightness control signal output from the I/O interface, a DC/DC converter for converting an operation voltage into the driving voltage according to the driving voltage control of the control unit, a voltage regulator for regulating the driving voltage output from the DC/DC converter to a reference voltage without ripple, a multi-channel driving unit for converting the reference voltage output from the voltage regulator into forward voltages of the plurality of color LED arrays according to a plurality of control signals, and a current source for adjusting the amount of the driving current flowing in the color LED backlight according to the driving current control of the control unit.

4 Claims, 8 Drawing Sheets

Prior art

DRIVE DEVICE OF COLOR LED BACKLIGHT

RELATED APPLICATIONS

The present application is based on, and claims priority from, Korean Application Number 2006-12691, filed Feb. 9, 2006, the disclosure of which is incorporated by reference herein in its entirety.

BACKGROUND OF THE INVENTION

1. Field of the Invention

The present invention relates to a drive device of a color light emitting diode (LED) used in a display apparatus, and more particularly, to a drive device of a color LED backlight which is capable of precisely adjusting the forward voltages of color LED arrays for each channel to provide optimal forward voltages to the respective color LED arrays, independently setting the number of LEDs for each color LED array, and reducing ripple of the forward voltages by voltage regulation.

2. Description of the Related Art

In general, at least two hundred eighty million display products are being demanded each year in a mobile display market including mobile phones, MP3 players, personal media players (PMP), automotive navigators, mobile or vehicle DVD/AV systems, and laptop computers. Most of the mobile display market is occupied by a thin film transistor-liquid crystal display (TFT-LCD) technology. Competition among enterprises for improvement of price and performance of the TFT-LCD is becoming severe.

Since the TFT is not self-luminous, the TFT LCD requires an additional light emitting element such as a backlight unit (BLU). The BLU can be embodied by various technologies. Most of LCD-BLUs which are commercially available use a cold cathode fluorescent lamp (CCFL). The CCFL has advantages such as high brightness, low manufacturing cost, a simple driving circuit and a thin tube shape. However, since the CCFL is weak against external impact, a mobile TFT-LCD having a size of about 5 inches or less uses a white LED.

Figure 1:
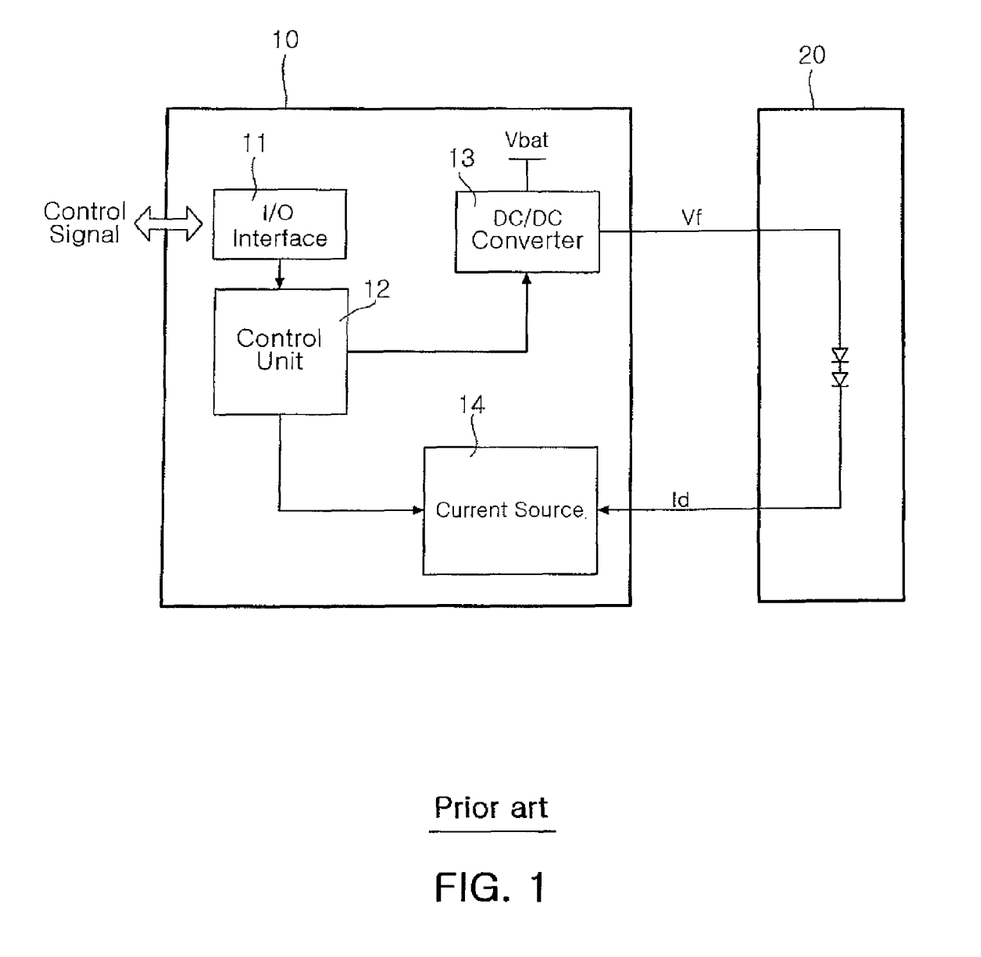
FIG. 1 is a block diagram showing the configuration of a conventional drive device of a white LED backlight.

FIG. 1 is a block diagram showing the configuration of a conventional drive device of a white LED backlight.

The conventional drive device 10 of the white LED backlight shown in FIG. 1 drives the white LED backlight 20 and includes an I/O interface 11 for inputting/outputting a signal, a control unit 12 for controlling a driving voltage and driving current according to a brightness control signal output from the I/O interface 11, a DC/DC converter 13 for converting the battery voltage Vbat of about 2.8 V into a forward voltage Vf of about 8 V and supplying the forward voltage Vf to the white LED backlight 20 by the driving voltage control of the control unit 12, and a current source 14 for adjusting the amount of driving current Id which flows in the white LED backlight 20 by the driving current control of the control unit 12.

Each LED of the white LED backlight 20 consumes driving current of about 10 mA and a driving voltage of about 1.8 to 3 V.

The conventional drive device of the white LED backlight properly adjusts the driving current amount of the white LED using a method for controlling the current amount of the white LED. More particularly, the control unit 12 can provide a control signal to the current source 14 to adjust brightness in a burst mode.

However, in the conventional drive device of the white LED backlight, ripple is generated in an output voltage of the DC/DC converter. Thus, a ripple phenomenon occurs in the forward voltage Vf. In addition, a boost-up voltage of the DC/DC converter cannot be easily changed.

When a color LED is used instead of the white LED, the number of the color LEDs is restricted by the forward voltage Vf and the forward voltage Vf of each color LED cannot be precisely adjusted.

In the CCFL or the white LED, since color reproducibility falls to about 70 to 80% of the NTSC standard, it is impossible to accomplish accurate color reproduction. In order to solve such a problem, research for implementing color reproducibility of approximately at least 90% using a color light source is actively ongoing. Now, color LEDs (RGB LEDs) are beginning to be commercialized in a liquid crystal display-high definition television (LCD-HDTV) market and an expert LCD monitor market and an application thereof is gradually expanded as a technology develops and production amount increases.

However, in the conventional drive device of the white LED backlight, due to LED characteristics, the color LEDs (RGB LEDs) are different in a driving voltage, that is, the level of a forward voltage Vf, and optical output efficiency. Accordingly, a function for adjusting the forward voltage Vf is required. When the LEDs are connected in series, the number of the LEDs varies or a difference between the forward voltages Vf increases.

In addition, in a mobile device, the DC/DC boost-up converter which generates the forward voltage for driving the LED is used. However, since the DC/DC converter generates the ripple, the forward voltage Vf becomes unstable.

SUMMARY OF THE INVENTION

Therefore, the present invention has been made in view of the above problems, and it is an object of the present invention to provide a drive device of a color LED backlight which is capable of precisely adjusting the forward voltages of color LED arrays for each channel to provide optimal forward voltages to the respective color LED arrays, independently setting the number of LEDs for each color LED array, and reducing ripple of the forward voltages by voltage regulation.

In accordance with an aspect of the present invention, there is provided a drive device for driving a color light emitting diode (LED) backlight which includes a plurality of color LED arrays, comprising: an I/O interface for inputting/outputting a signal; a control unit for controlling a driving voltage and driving current according to a brightness control signal output from the I/O interface; a DC/DC converter for converting an operation voltage into the driving voltage according to the driving voltage control of the control unit; a voltage regulator for regulating the driving voltage output from the DC/DC converter to a reference voltage without ripple; a multi-channel driving unit for converting the reference voltage output from the voltage regulator into forward voltages of the plurality of color LED arrays according to a plurality of control signals; and a current source for adjusting the amount of the driving current flowing in the color LED backlight according to the driving current control of the control unit.

The voltage regulator may comprise an operational amplifier for non-inversion-amplifying a color voltage; and a transistor for converting the driving voltage output from the DC/DC converter into the reference voltage according to the level of an output voltage of the operational amplifier.

The plurality of control signals may include first, second and third control signals, the plurality of color LED arrays may include first, second and third color LED arrays, and the multi-channel driving unit may comprise a first channel driving portion for converting the reference voltage output from the voltage regulator into a first forward voltage of the first color LED array according to the first control signal; a second channel driving portion for converting the reference voltage output from the voltage regulator into a second forward voltage of the second color LED array according to the second control signal; and a third channel driving portion for converting the reference voltage output from the voltage regulator into a third forward voltage of the third color LED array according to the third control signal.

The first channel driving portion may be implemented by a red channel driving portion, the second channel driving portion may be implemented by a green channel driving portion, and the third channel driving portion may be implemented by a blue channel driving portion.

Each of the first, second and third channel driving portions may comprise a filter for filtering a corresponding one of the first, second and third control signals within a predetermined band; an amplifier for amplifying the control signal output from the filter with a predetermined gain; and a driver for converting the reference voltage output from the voltage regulator into the forward voltage according to the control signal output from the amplifier.

The first, second and third control signals may be digital signals, and each of the first, second and third channel driving units may comprise a digital/analog converter (DAC) for converting a corresponding one of the digital signals into an analog control signal; and a driver for converting the reference voltage output from the voltage regulator into the forward voltage according to the control signal output from the DAC.

Each of the first, second and third channel driving portions 150-1, 150-2 and 150-3 may further comprise a filter for filtering the control signal output from the DAC within a predetermined band; and an amplifier for amplifying the control signal output from the filter with a predetermined gain and supplying the amplified control signal to the driver.

In accordance with an aspect of the present invention, there is provided a drive device for driving a color LED backlight which includes first, second and third color LED arrays, comprising: an I/O interface for inputting/outputting a signal; a control unit for controlling a driving voltage and driving current according to a brightness control signal output from the I/O interface; a DC/DC converter for converting an operation voltage into the driving voltage according to the driving voltage control of the control unit; a voltage regulator for regulating the driving voltage output from the DC/DC converter to a reference voltage without ripple; a multi-channel driving unit which includes first, second and third channel driving portions for converting the reference voltage output from the voltage regulator into forward voltages of the first, second and third color LED arrays, according to first, second and third control signals; and a current source for adjusting the amount of the driving current flowing in the color LED backlight according to the driving current control of the control unit.

The first channel driving portion may be implemented by a red channel driving portion, the second channel driving portion may be implemented by a green channel driving portion, and the third channel driving portion may be implemented by a blue channel driving portion.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, preferred embodiments of the present invention will be described in detail with reference to the annexed drawings. In the drawings, the same or similar elements are denoted by the same reference numerals even though they are depicted in different drawings.

Figure 2:
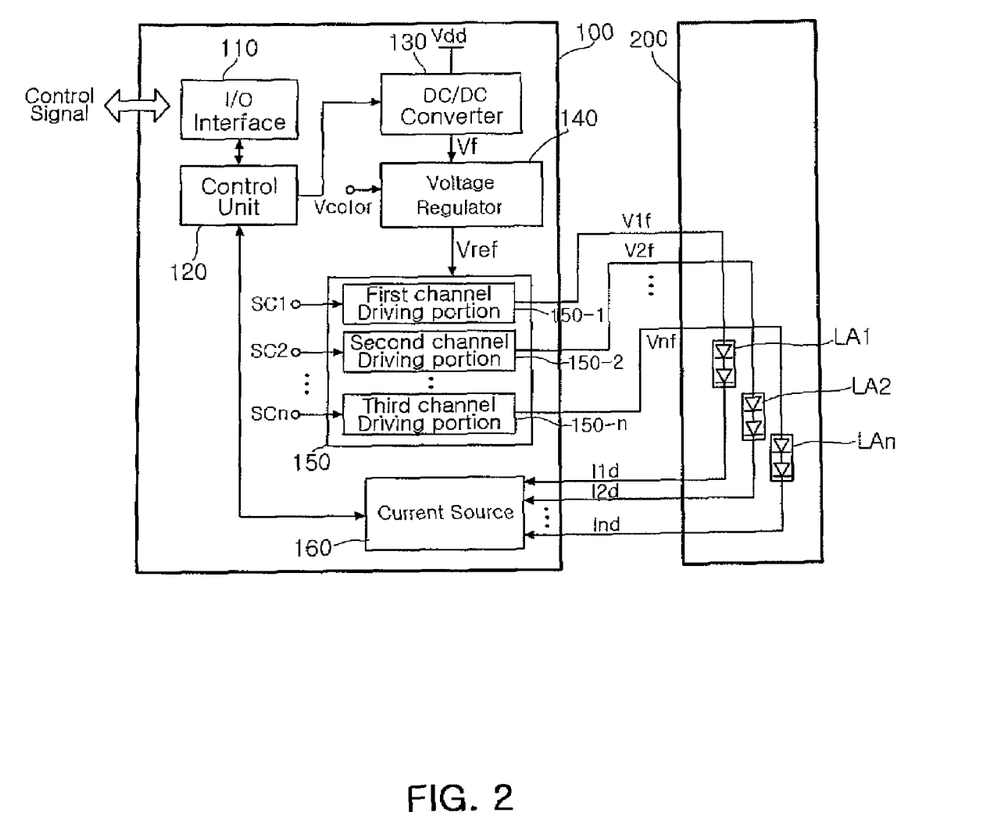
FIG. 2 is a block diagram showing the configuration of a drive device of a color LED backlight according to the present invention.

FIG. 2 is a block diagram showing the configuration of a drive device of a color LED backlight according to the present invention.

Referring to FIG. 2, the drive device of the color LED backlight according to the present invention drives the color LED backlight 200 including a plurality of color LED arrays LA1 to LAn and includes an I/O interface 110, a control unit 120, a DC/DC converter 130, a voltage regulator 140, a multi-channel driving unit 150, and a current source 160.

The I/O interface 110 inputs/outputs a signal.

The control unit 120 controls a driving voltage and driving current according to a brightness control signal output from the I/O interface 110.

The DC/DC converter 130 converts an operation voltage Vbat into a driving voltage VD according to the driving voltage control of the control unit 120. Here, the operation voltage Vbat is a battery voltage of about 2.8 to 3.6 V.

The voltage regulator 140 includes a constant voltage element or circuit such as a Zener diode and regulates the driving voltage output from the DC/DC converter 130 into a reference voltage Vref without ripple.

The multi-channel driving unit 150 converts the reference voltage Vref output form the voltage regulator 140 into respective forward voltages V1$f$ to Vnf of the color LED arrays LA1 to LAn according to a plurality of control signals SC1 to SCn.

The current source 160 adjusts the amount of the driving current Id which flows in the color LED backlight 200 according to the driving current control of the control unit 120.

Figure 3:
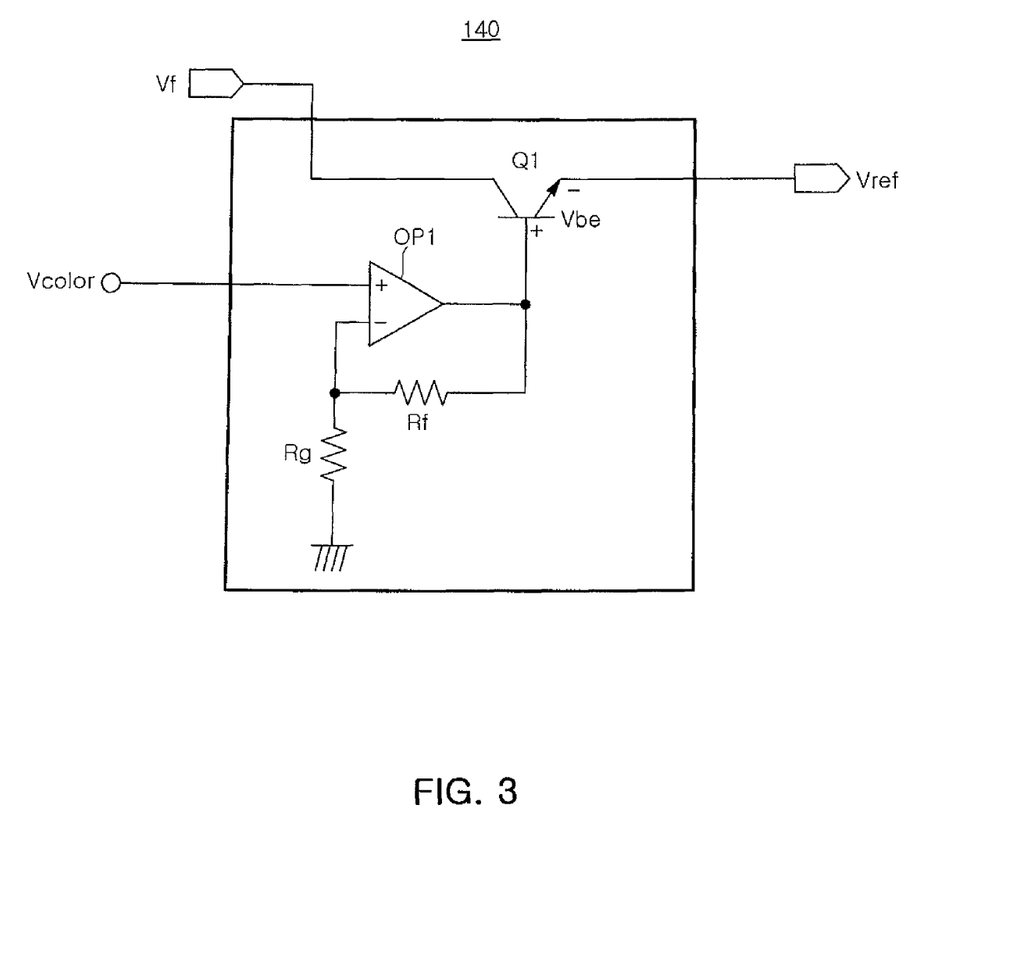
FIG. 3 is a circuit diagram showing the configuration of a voltage regulator shown in FIG. 2.

FIG. 3 is a circuit diagram showing the configuration of the voltage regulator shown in FIG. 2.

Referring to FIG. 3, the voltage regulator 140 includes an operational amplifier OP1 for non-inversion-amplifying a color voltage Vcolor and a transistor Q1 for converting the driving voltage VD output from the DC/DC converter 130 into the reference voltage Vref according to the level of the output voltage of the operational amplifier OP1. Here, the color voltage Vcolor is a predetermined value corresponding to a conversion ratio of the driving voltage VD to the reference voltage Vref and may be supplied from the control unit 120.

Figure 4:
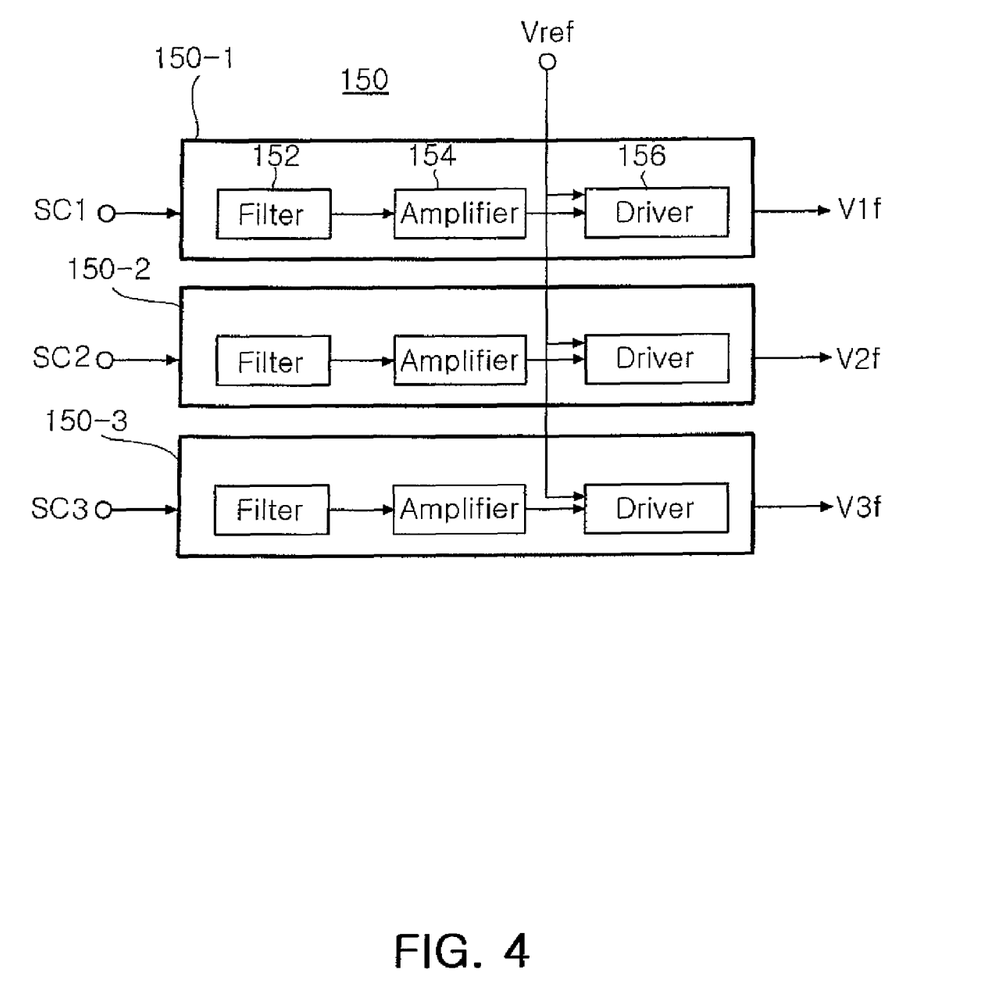
FIG. 4 is a block diagram showing the configuration of a first embodiment of a multi-channel driving unit shown in FIG. 2.
Figure 5:
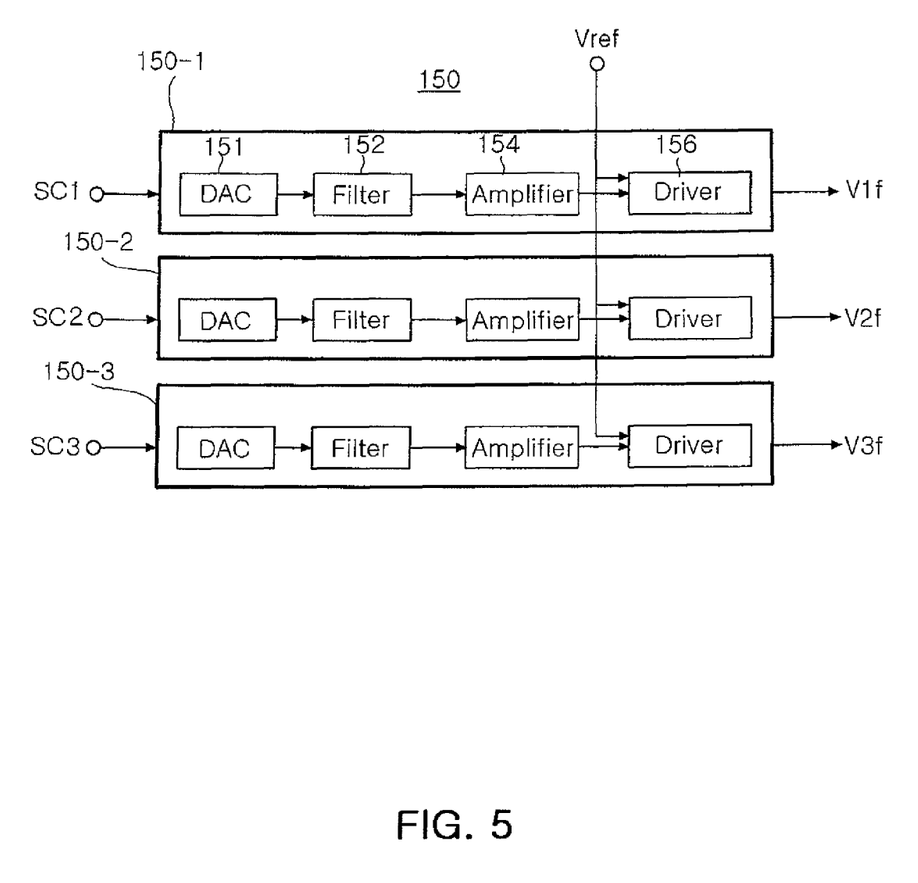
FIG. 5 is a block diagram showing the configuration of a second embodiment of the multi-channel driving unit shown in FIG. 2.

FIG. 4 is a block diagram showing the configuration of a first embodiment of the multi-channel driving unit shown in FIG. 2 and FIG. 5 is a block diagram showing the configuration of a second embodiment of the multi-channel driving unit shown in FIG. 2.

Referring to FIGS. 4 and 5, the common components of the embodiments of the multi-channel driving unit 150 will be described. The multi-channel driving unit 150 includes a first channel driving portion 150-1 for converting the reference voltage Vref output from the voltage regulator 140 into a first forward voltage V1$f$ of the first color LED array LA1 according to the first control signal SC1, a second channel driving portion 150-2 for converting the reference voltage Vref output from the voltage regulator 140 into a second forward voltage V2$f$ of the second color LED array LA2 according to the second control signal SC2, and a third channel driving portion 150-3 for converting the reference voltage Vref output from the voltage regulator 140 into a third forward voltage V3$f$ of the third color LED array LA3 according to the third control signal SC3.

The first, second and third channel driving portions 150-1, 150-2 and 150-3 can be implemented by at least two color LEDs among LEDs of red (R), green (G) and blue (B). In a preferred embodiment, the first channel driving portion 150-1 is implemented by a red (R) channel driving portion, the second channel driving portion 150-2 is implemented by a green (G) channel driving portion, and the third channel driving portion 150-3 is implemented by a blue (B) channel driving portion.

The multi-channel driving unit 150 may be configured as shown in FIG. 4 when the first to third control signals SC1 to SC3 are analog signals. Now, the multi-channel driving unit 150 will be described in detail with reference to FIG. 4.

Referring to FIG. 4, each of the first to third channel driving portions 150-1 to 150-3 includes a filter 152 for filtering a corresponding one of the first, second and third control signals within a predetermined band, an amplifier 154 for amplifying the control signal output from the filter 152 with a predetermined gain, and a driver 156 for converting the reference voltage Vref output from the voltage regulator 140 into the forward voltage according to the control signal output from the amplifier 154.

Alternatively, when the first to third control signals SC1 to SC3 are digital signals, the multi-channel driving unit 150 may be configured as shown in FIG. 5. Now, the multi-channel driving unit 150 will be described in detail with reference to FIG. 5.

Referring to FIG. 5, each of the first to third channel driving portions 150-1 to 150-3 includes a digital/analog converter (DAC) 151 for converting a corresponding one of the first, second and third digital control signals into an analog control signal, a filter 152 for filtering the analog control signal output from the DAC 151 within a predetermined band, an amplifier 154 for amplifying the control signal output from the filter 152 with a predetermined gain and supplying the amplified signal to a driver 156, and the driver 156 for converting the reference voltage Vref output from the voltage regulator 140 into the forward voltage according to the control signal output from the DAC 151.

Figure 6:
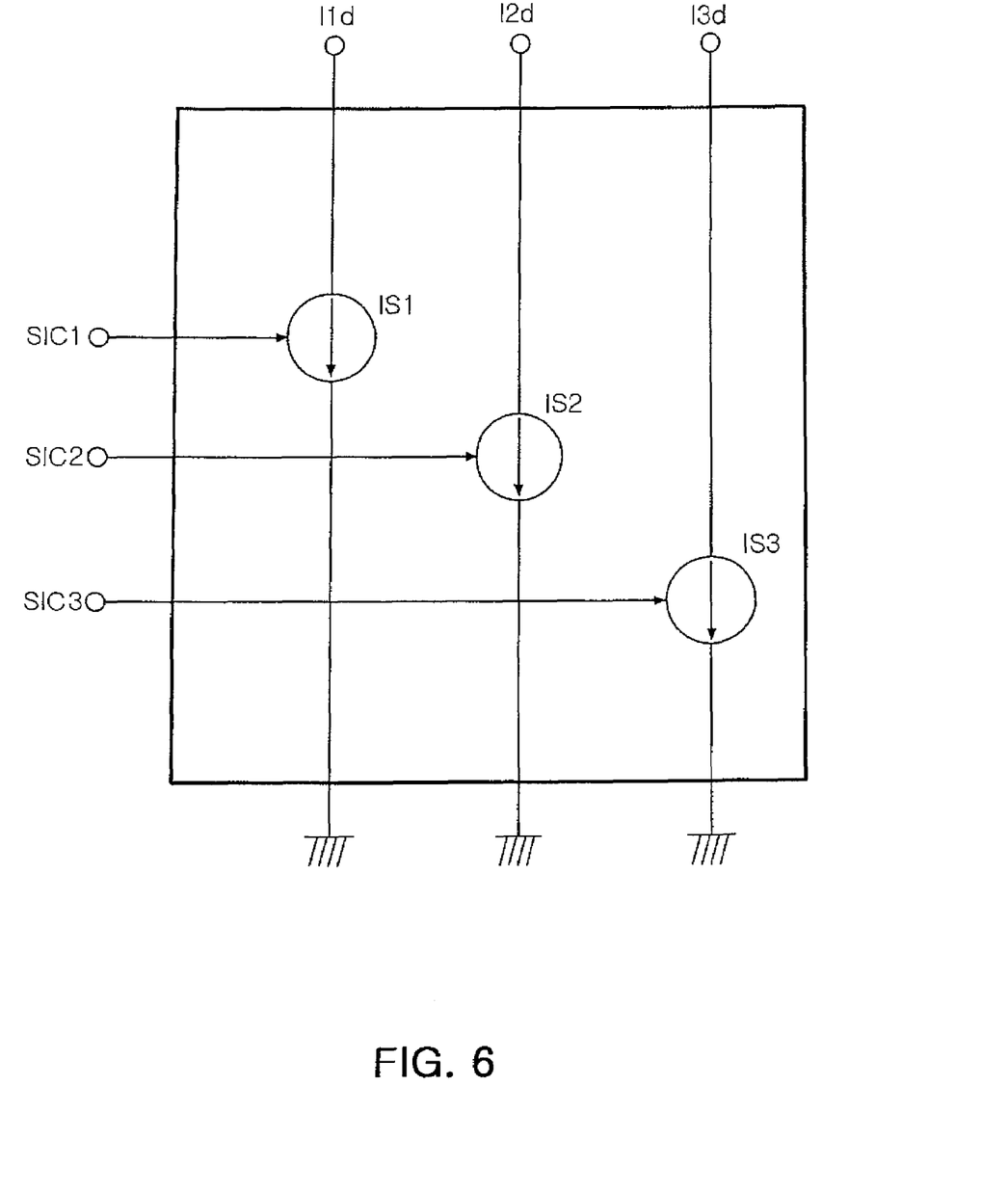
FIG. 6 is a circuit diagram showing a current source shown in FIG. 2.

FIG. 6 is a circuit diagram showing the current source shown in FIG. 2.

Referring to FIG. 6, the current source 160 includes a first current source IS1 for adjusting the amount of a first driving current I1$d$ flowing in the first color LED array LA1 of the color LED backlight 200 according to the driving current control of the control unit 120, a second current source IS2 for adjusting the amount of a second driving current I2$d$ flowing in the second color LED array LA2 of the color LED backlight 200 according to the driving current control of the control unit 120, and a third current source IS3 for adjusting the amount of a third driving current I3$d$ flowing in the third color LED array LA3 of the color LED backlight 200 according to the driving current control of the control unit 120.

Hereinafter, the drive device for driving the color LED backlight 200 including the first to third color LED arrays LA1 to LA3 will be described with reference to FIG. 7.

Figure 7:
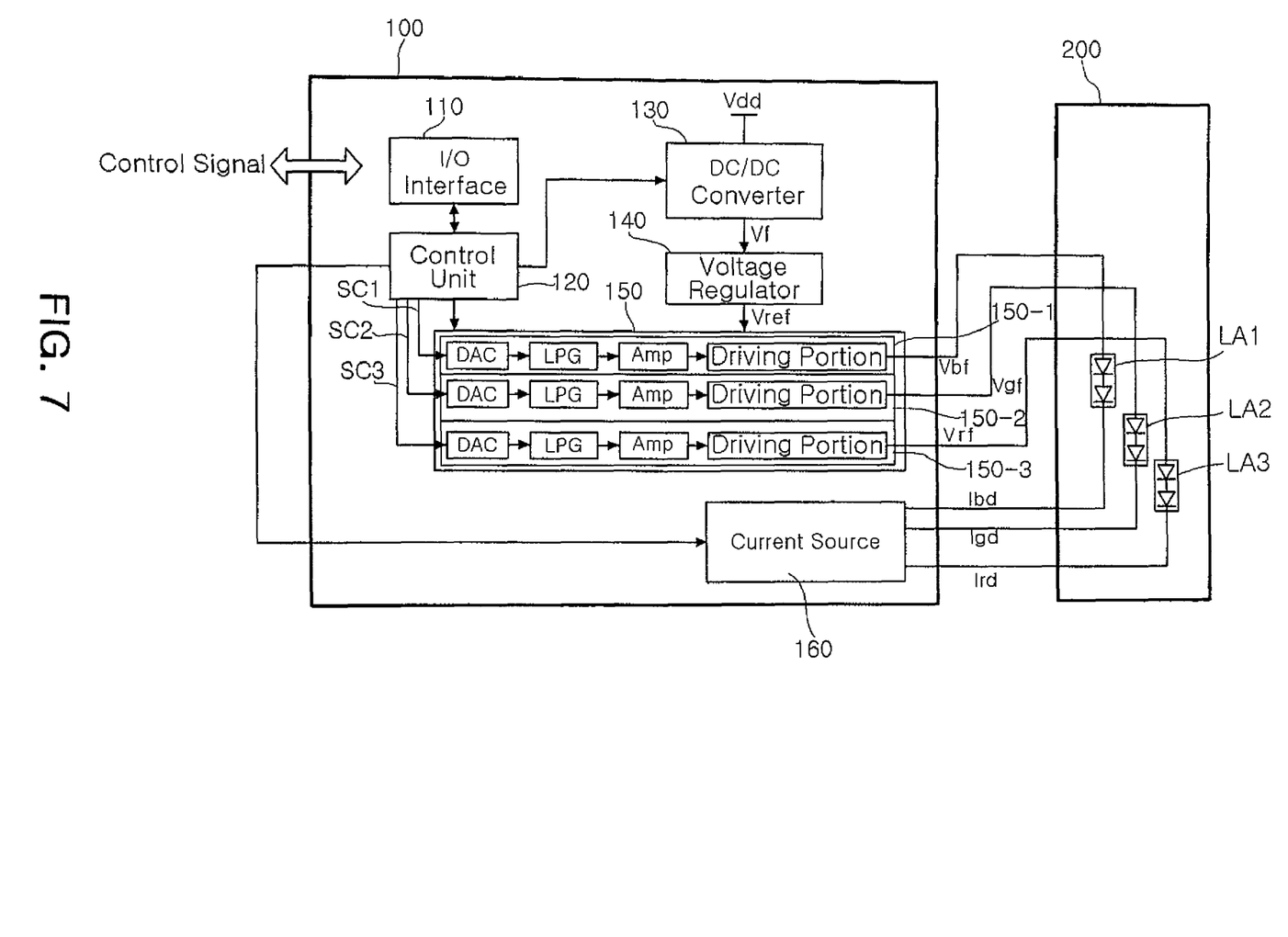
FIG. 7 is a block diagram showing the configuration of a preferred embodiment of the drive device of the color LED backlight according to the present invention.

FIG. 7 is a block diagram showing the configuration of a preferred embodiment of the drive device of the color LED backlight according to the present invention.

Referring to FIG. 7, the drive device 100 of the color LED backlight according to the present invention includes an I/O interface 110 for inputting/outputting a signal, a control unit 120 for controlling a driving voltage and driving current according to a brightness control signal output from the I/O interface 110, a DC/DC converter 130 for converting an operation voltage Vbat into a driving voltage VD according to the driving voltage control of the control unit 120, a voltage regulator 140 for converting the driving voltage VD output from the DC/DC converter 130 into a reference voltage Vref without ripple, a multi-channel driving unit 150 which includes first, second and third channel driving portions 150-1, 150-2 and 150-3 for converting the reference voltage Vref output from the voltage regulator 140 into the respective forward voltages Vbf, Vgf and Vrf of the first, second and third color LED arrays LA1 to LA3, and a current source 160 for adjusting the amounts of the first, second and third driving currents I1$d$, I2$d$ and I3$d$ which flow in the color LED backlight 200 according to the driving current control of the control unit 120.

The first channel driving portion 150-1 is implemented by a red (R) channel driving portion, the second channel driving portion 150-2 is implemented by a green (G) channel driving portion, and the third channel driving portion 150-3 is implemented by a blue (B) channel driving portion.

Figure 8:
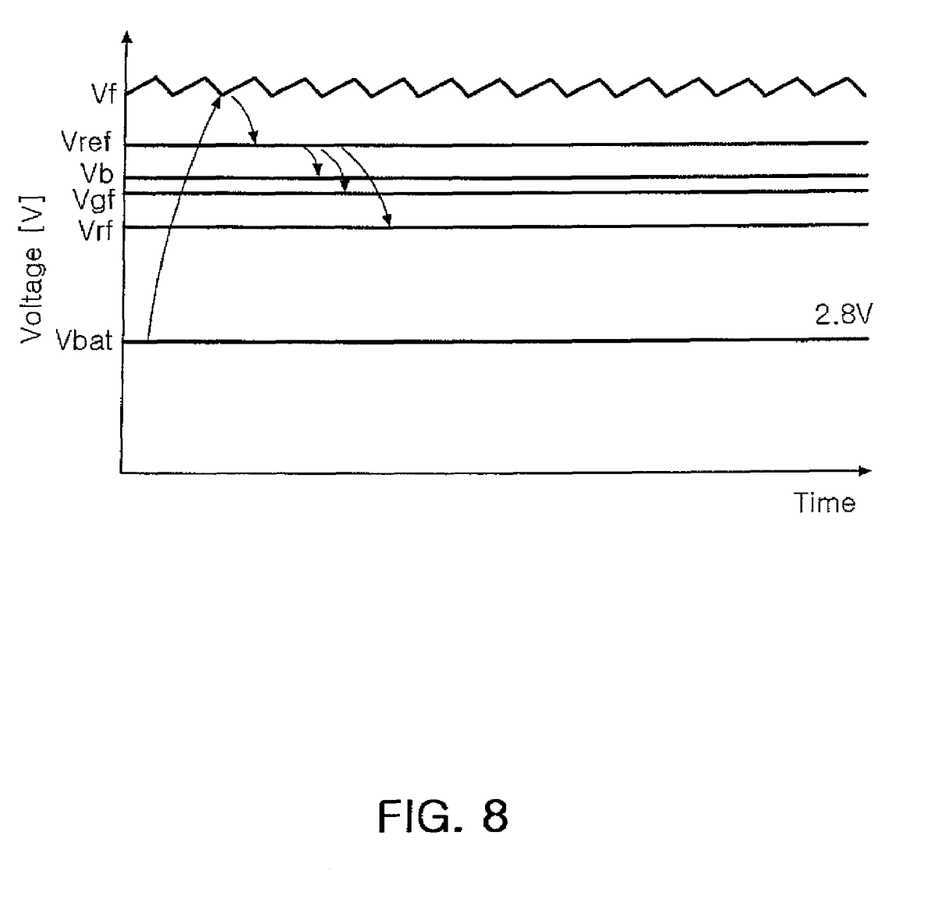
FIG. 8 is a waveform diagram showing voltages of the drive device of the color LED backlight shown in FIG. 7.

FIG. 8 is a waveform diagram showing the voltages of the drive device of the color LED backlight shown in FIG. 7. In FIG. 8, Vf denotes the forward voltage, Vref denotes the reference voltage, Vbf, Vgf and Vrf respectively denote the forward voltages of the LED arrays of blue (B), green (G) and red (R). Vbat denotes a battery voltage.

Hereinafter, the operation and the effect of the present invention will be described in detail with reference to the attached drawings.

Referring to FIG. 2, the drive device of the color LED backlight according to the present invention drives the color LED backlight 200 which includes the plurality of color LED arrays LA1 to LA$n$. At this time, the plurality of color LED arrays LA1 to LA$n$ are driven by the forward voltages V1$f$ to V$n$$f$, respectively.

In FIG. 2, the I/O interface 110 according to the present invention inputs/outputs the signal, that is, inputs the brightness control signal to the control unit 120. The control unit 120 controls the driving voltage of the DC/DC converter 130 and the driving current of the current source 160, according to the brightness control signal output from the I/O interface 110.

The DC/DC converter 130 converts the operation voltage Vbat of about 2.8 V into the driving voltage VD of about 8 V according to the driving voltage control of the control unit 120. The voltage regulator 140 regulates the driving voltage VD output from the DC/DC converter 130 to the reference voltage Vref without ripple.

The multi-channel driving unit 150 converts the reference voltage Vref output from the voltage regulator 140 into the forward voltages V1f to Vnf of the plurality of color LED arrays LA1 to LAn according to the plurality of control signals SC1 to SCn. The current source 160 adjusts the amount of the driving current Id flowing in the color LED backlight 200 according to the driving current control of the control unit 120.

Now, the voltage regulator 140 will be described in detail with reference to FIG. 3. The operational amplifier OP1 of the voltage regulator 140 amplifies the color voltage Vcolor with a predetermined non-inversion amplifying ratio (1+Rf/Rg) and supplies the amplified voltage to the base of the transistor Q1. Then, the transistor Q1 converts the driving voltage VD output from the DC/DC converter 130 into the reference voltage Vref according to the level of the output voltage of the operational amplifier OP1.

Now, the multi-channel driving unit 150 will be described with reference to FIGS. 4 and 5. The multi-channel driving unit 150 includes the first channel driving portion 150-1, the second channel driving portion 150-2, and the third channel driving portion 150-3. The first channel driving portion 150-1 converts the reference voltage Vref output from the voltage regulator 140 into the forward voltage V1f of the first color LED array LA1 according to the first control signal SC1. The second channel driving portion 150-2 converts the reference voltage Vref output from the voltage regulator 140 into the forward voltage V2f of the second color LED array LA2 according to the second control signal SC2. The third channel driving portion 150-3 converts the reference voltage Vref output from the voltage regulator 140 into the forward voltage V3f of the third color LED array LA3 according to the third control signal SC3.

Meanwhile, in a case where the color LED backlight 200 includes the LED arrays LA1, LA2 and LA3 of red (R), green (G) and blue (B), the first channel driving portion 150-1 is implemented by a red (R) channel driving portion, the second channel driving portion 150-2 is implemented by a green (G) channel driving portion, and the third channel driving portion 150-3 is implemented by a blue (B) channel driving portion.

The first channel driving portion 150-1 drives the red (R) LED array LA1, the second channel driving portion 150-2 drives the green (G) LED array LA2, and the third channel driving portion 150-3 drives the blue (B) LED array LA3.

When the control signals SC1 to SC3 are analog signals, the first to third forward voltages V1f, V2f and V3f are supplied by the multi-channel driving unit 150 shown in FIG. 4.

Referring to FIG. 4, in the first channel driving portion 150-1, when the first control signal SC1 is filtered and amplified by the filter 152 and the amplifier 154 and supplied to the driver 156, the driver 156 converts the reference voltage Vref output from the voltage regulator 140 into the first forward voltage V1f according to the control signal output from the amplifier 154 and supplies the first forward voltage V1f to the red (R) LED array LA1.

Similarly, in the second channel driving portion 150-2, when the second control signal SC2 is filtered and amplified by the filter 152 and the amplifier 154 and supplied to the driver 156, the driver 156 converts the reference voltage Vref output from the voltage regulator 140 into the second forward voltage V2f according to the control signal output from the amplifier 154 and supplies the second forward voltage V2f to the green (G) LED array LA2.

Similarly, in the third channel driving portion 150-3, when the third control signal SC3 is filtered and amplified by the filter 152 and the amplifier 154 and supplied to the driver 156, the driver 156 converts the reference voltage Vref output from the voltage regulator 140 into the third forward voltage V3f according to the control signal output from the amplifier 154 and supplies the third forward voltage V3f to the blue (B) LED array LA3.

When the control signals SC1 to SC3 are digital signals, the first to third forward voltages V1f, V2f and V3f are supplied by the multi-channel driving unit 150 shown in FIG. 5.

Each of the first, second and third channel driving portion 150-1, 150-2 and 150-3 further includes the DAC 151. The first, second and third control signals SC1, SC2 and SC3 which are the digital signals are converted into the analog control signals by the DAC 151 and supplied to the respective filters 152. The next operation is the same as that described with reference to FIG. 4 and thus their description will be omitted.

Now, the operation of the current source 160 will be described with reference to FIG. 6. The first current source IS1 of the current source 160 adjusts the amount of the first driving current I1d flowing in the first color LED array LA1 of the color LED backlight 200 according to the driving current control of the control unit 120. The second current source IS2 of the current source 160 adjusts the amount of the second driving current I2d flowing in the second color LED array LA2 of the color LED backlight 200 according to the driving current control of the control unit 120. The third current source IS3 of the current source 160 adjusts the amount of the first driving current I3d flowing in the first color LED array LA3 of the color LED backlight 200 according to the driving current control of the control unit 120.

As described above, in the present invention, the LED arrays of the color LED backlight 200 can be driven in an optimal state by the multi-channel driving unit 150 and the current source 160, according to the control of the control unit 120.

As shown in FIG. 7, in a case where the color LED backlight 200 driven by the drive device 100 according to the present invention includes the first, second and third color LED arrays LA1 to LA3, the operation of the drive device will be described with reference to FIGS. 7 and 8.

Referring to FIG. 7, in the drive device of the color LED backlight according to the present invention, the I/O interface 110 inputs/outputs the signal, that is, inputs the control signal to the control unit 120. The control unit 120 controls the driving voltage of the DC/DC converter 130 and the driving current of the current source 160, according to the brightness control signal. Then, the DC/DC converter 130 converts the operation voltage Vbat of about 2.8 V into the driving voltage VD of about 8 V according to the driving voltage control of the control unit 120, as shown in FIG. 8.

At this time, the driving voltage VD includes ripple, as shown in FIG. 8. The voltage regulator 140 regulates the driving voltage VD output from the DC/DC converter 130 to the reference voltage Vref without ripple.

Next, the multi-channel driving unit 150 includes the first, second and third channel driving portions 150-1, 150-2 and 150-3. The first, the second and third channel driving portions 150-1, 150-2 and 150-3 convert the reference voltage Vref output from the voltage regulator 140 into the respective forward voltages V1f to V3f of the first to third color LED arrays LA1 to LA3.

The current source 160 adjusts the amounts of the first, second and third driving currents I1d, I2d and I3d flowing in the color LED backlight 200 according to the driving current control of the control unit 120.

Meanwhile, in a case where the color LED backlight 200 includes the LED arrays LA1, LA2 and LA3 of red (R), green (G) and blue (B), the first channel driving portion 150-1 is implemented by the red (R) channel driving portion, the second channel driving portion 150-2 is implemented by the green (G) channel driving portion, and the third channel driving portion 150-3 is implemented by the blue (B) channel driving portion.

The first channel driving portion 150-1 drives the red (R) LED array LA1, the second channel driving portion 150-2 drives the green (G) LED array LA2, and the third channel driving portion 150-3 drives the blue (B) LED array LA3.

As described above, according to the present invention, in a drive device of a color LED backlight which is applicable to a display apparatus, it is possible to precisely adjust the forward voltages of color LED arrays for each channel to provide optimal forward voltages to the respective color LED arrays, independently set the number of LEDs for each color LED array, and reduce ripple of the forward voltages by voltage regulation.

That is, it is possible to separately drive the color LEDs with optimal forward voltages by adjusting the color LED forward voltage Vf to supply different LED forward voltages Vrf, Vgf and Vbf of red (R), green (G) and blue (B). It is possible to separately adjust the LED forward voltages Vrf, Vgf and Vbf of red (R), green (G) and blue (B) using three different driving channels. Accordingly, since the number of color LEDs is not restricted by the forward voltage when the LEDs are connected in series, it is possible to separately change the number of LEDs. Furthermore, it is possible to remove noise included in the forward voltages of the color LEDs using a regulator and to prevent forward ripple from being modulated in the light output of the LED.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A drive device for driving a color light emitting diode (LED) backlight which includes a plurality of color LED arrays, comprising:
    an I/O interface for inputting/outputting a signal;
    a control unit configured to control a driving voltage and driving current according to a brightness control signal output from the I/O interface;
    a DC/DC converter configured to convert an operation voltage into the driving voltage according to the driving voltage control of the control unit;
    a voltage regulator configured to regulate the driving voltage output from the DC/DC converter to a reference voltage without ripple;
    a multi-channel driving unit configured to convert the reference voltage output from the voltage regulator into forward voltages of the plurality of color LED arrays according to a plurality of control signals that includes first, second and third control signals; and
    a current source configured to adjust the amount of the driving current flowing in the color LED backlight according to the driving current control of the control unit;
    wherein the plurality of color LED arrays includes first, second and third color LED arrays, and the multi-channel driving unit further comprises:
        a first channel driving portion configured to convert the reference voltage output from the voltage regulator into a first forward voltage of the first color LED array according to the first control signal, the first channel driving portion is implemented by a red channel driving portion;
        a second channel driving portion configured to convert the reference voltage output from the voltage regulator into a second forward voltage of the second color LED array according to the second control signal, the second channel driving portion is implemented by a green channel driving portion; and
        a third channel driving portion configured to convert the reference voltage output from the voltage regulator into a third forward voltage of the third color LED array according to the third control signal, the third channel driving portion is implemented by a blue channel driving portion;
    wherein each of the first, second and third channel driving portions includes:
        a filter configured to filter a corresponding one of the first, second and third control signals within a predetermined band;
        an amplifier configured to amplify the control signal output from the filter with a predetermined gain; and
        a driver configured to convert the reference voltage output from the voltage regulator into the forward voltage according to the control signal output from the amplifier.

2. The device according to claim 1, wherein the voltage regulator comprises:
    an operational amplifier for non-inversion-amplifying a color voltage; and
    a transistor for converting the driving voltage output from the DC/DC converter into the reference voltage according to the level of an output voltage of the operational amplifier.

3. The device according to claim 1, wherein:
    the first, second and third control signals are digital signals, and
    each of the first, second and third channel driving units portions comprises:
        a digital/analog converter (DAC) for converting a corresponding one of the digital signals into an analog control signal; and
        a driver for converting the reference voltage output from the voltage regulator into the forward voltage according to the control signal output from the DAC.

4. A drive device for driving a color light emitting diode (LED) backlight, which includes a plurality of color LED arrays, comprising:
    an I/O interface configured to input/output a signal;
    a control unit configured to control a driving voltage and driving current according to a brightness control signal output from the I/O interface;
    a DC/DC converter configured to convert an operation voltage into the driving voltage according to the driving voltage control of the control unit;
    a voltage regulator configured to regulate the driving voltage output from the DC/DC converter to a reference voltage without ripple;
    a multi-channel driving unit configured to convert the reference voltage output from the voltage regulator into forward voltages of the plurality of color LED arrays according to a plurality of control signals; and a current source configured to adjust the amount of the driving current flowing in the color LED backlight according to the driving current control of the control unit;

wherein the plurality of control signals includes first, second and third control signals;

wherein the plurality of color LED arrays includes first, second and third color LED arrays; and wherein the multi-channel driving unit further comprises:
- a first channel driving portion configured to convert the reference voltage output from the voltage regulator into a first forward voltage of the first color LED array according to the first control signal, the first channel driving portion is implemented by a red channel driving portion;
- a second channel driving portion configured to convert the reference voltage output from the voltage regulator into a second forward voltage of the second color LED array according to the second control signal, the second channel driving portion is implemented by a green channel driving portion; and
- a third channel driving portion configured to convert the reference voltage output from the voltage regulator into a third forward voltage of the third color LED array according to the third control signal, the third channel driving portion is implemented by a blue channel driving portion;

wherein the first, second and third control signals are digital signals, and each of the first, second and third channel driving portions includes:
- a digital/analog converter (DAC) configured to convert a corresponding one of the digital signals into an analog control signal;
- a driver configured to convert the reference voltage output from the voltage regulator into the forward voltage according to the control signal output from the DAC;
- a filter configured to filter the control signal output from the DAC within a predetermined band; and
- an amplifier configured to amplify the control signal output from the filter with a predetermined gain and supplying the amplified control signal to the driver.

* * * * *